United States Patent
Ness et al.

(10) Patent No.: US 10,131,373 B1
(45) Date of Patent: Nov. 20, 2018

(54) UTILITY CART SYSTEM FOR A MOTOR VEHICLE

(71) Applicant: FORD GLOBAL TECHNOLOGIES, LLC, Dearborn, MI (US)

(72) Inventors: Kyle David Ness, Royal Oak, MI (US); Eric Joseph Hausman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/818,145

(22) Filed: Nov. 20, 2017

(51) Int. Cl.
*B62B 3/02* (2006.01)
*B62B 3/14* (2006.01)
*B60R 5/04* (2006.01)

(52) U.S. Cl.
CPC .............. *B62B 3/1404* (2013.01); *B60R 5/04* (2013.01); *B62B 3/027* (2013.01); *B62B 2205/04* (2013.01); *B62B 2205/123* (2013.01)

(58) Field of Classification Search
CPC ......... B62B 3/1404; B62B 3/02; B62B 3/022; B62B 3/025; B62B 3/027; B62B 2205/04; B62B 2205/12; B62B 2205/123; B60R 5/04
USPC ..................... 280/639, 38, 37, 651
See application file for complete search history.

(56) References Cited

U.S. PATENT DOCUMENTS

| | | | |
|---|---|---|---|
| 6,045,150 A | 4/2000 | Al-Toukhi | |
| 6,070,899 A | 6/2000 | Gines | |
| 8,083,253 B1* | 12/2011 | Butler | B62B 3/027 |
| | | | 141/340 |
| 8,333,404 B2 | 12/2012 | Moster | |
| 8,408,581 B1 | 4/2013 | Hunter | |
| 9,126,610 B1 | 9/2015 | Abiri | |
| 9,211,899 B2* | 12/2015 | Beauchamp | B62B 5/0003 |
| 9,440,594 B1 | 9/2016 | Clamont Bello et al. | |
| 9,573,610 B1* | 2/2017 | Chaturvedi | B62B 3/022 |
| 9,849,582 B2* | 12/2017 | Cheff | B25H 1/04 |
| 2008/0061531 A1* | 3/2008 | Nugent | B62B 3/027 |
| | | | 280/638 |
| 2008/0303248 A1 | 12/2008 | Chaparro | |
| 2014/0140797 A1* | 5/2014 | Howe | B62B 3/027 |
| | | | 414/498 |
| 2016/0347341 A1* | 12/2016 | Tauber | B62B 3/027 |
| 2017/0088154 A1* | 3/2017 | Lin | B62B 3/022 |

FOREIGN PATENT DOCUMENTS

WO 2005028277 A1 3/2005

* cited by examiner

*Primary Examiner* — John D Walters
(74) *Attorney, Agent, or Firm* — Vichit Chea; King & Schickli, PLLC

(57) ABSTRACT

A utility cart system for a motor vehicle includes a support frame, a base, a folding wall assembly and a folding leg assembly. A method of transporting goods to and from a motor vehicle utilizing a utility cart system is also described.

20 Claims, 10 Drawing Sheets

UTILITY CART SYSTEM FOR A MOTOR VEHICLE

TECHNICAL FIELD

This document relates generally to the motor vehicle equipment field and, more particularly, to a new and improved utility cart system that may be fully integrated into a load floor of a motor vehicle when not in use and removed from the vehicle and erected into a utility cart for a wide range of different applications when in use.

BACKGROUND

This document relates to a new and improved utility cart system for a motor vehicle that may be stowed as an integral part of the load floor when not in use and erected into a functional utility cart with a wide range of applications. Such a utility cart may provide a seamless way to load or unload a motor vehicle in a convenient and efficient manner. Such a utility cart may substantially promote customer satisfaction with a motor vehicle equipped with the utility cart system.

SUMMARY

In accordance with the purposes and benefits described herein, a utility cart system is provided for a motor vehicle. That utility cart system comprises a support frame, a base mounted on a pivot axis to the support frame, a folding wall assembly carried on the base and a folding leg assembly carried on the support frame. The base is displaceable between a stowed position forming an integral portion of a load floor of the motor vehicle and a use position. The folding wall assembly is displaceable between a home position resting flat along the base and a deployed position providing upstanding sidewalls for a utility cart. The folding leg assembly is displaceable between a first position collapsed and extending along the base and a second position projecting from and supporting the utility cart.

The base may include a first face and a second face. The folding wall assembly may be carried on the second face.

The first face and the load floor of the motor vehicle may be covered by a matching cover layer. In this way, the utility cart system may comprise an integral portion of the load floor when the utility cart system is stowed in the motor vehicle between uses.

The folding leg assembly may include a first section and a second section. The first section may include a first pivot connection to the support frame. The second section may include a second pivot connection to the support frame. The first section may further include a first roller carried on a first leg and a second roller carried on a second leg. The second section may include a third roller carried on a third leg and a fourth roller carried on a fourth leg. For purposes of this document, the term "roller" is considered to include wheels, casters and any like structures that allow the utility cart to roll across the ground, a floor or another surface when the legs are in the second position supporting the utility cart.

The utility cart system may also include a latching mechanism. That latching mechanism functions to selectively latch the folding leg assembly in the first position or the second position. That latching system may further include a twist knob. That twist knob may also be used to secure the base in either the stowed position or the use position.

The folding wall assembly may include a locking feature to selectively lock the folding wall assembly in the home position and the deployed position. The locking feature may include a plurality of locking clips and a lock release actuator. That lock release actuator may include a knob and a cooperating cable.

In one or more embodiments of the utility cart system, the folding wall assembly may include a first wall mounted by a first hinge to the base, a second wall mounted by a second hinge to the base, a third wall mounted by a third hinge to the base and a fourth wall mounted by a fourth hinge to the base.

In accordance with an additional aspect, a method is provided of transporting goods to and from a motor vehicle. That method comprises the steps of: (a) removing a utility cart from a receiver in the motor vehicle, (b) unfolding a folding leg assembly of the utility cart by displacing the folding leg assembly from a first position to a second position, (c) displacing a folding wall assembly from a home position to a deployed position and (d) pivoting a base of the utility cart from a stowed position to a use position whereby the folding wall assembly is reoriented from a downwardly projecting position to an upwardly projecting position.

The displacing of the folding wall assembly from the home position to the deployed position includes releasing a locking feature and pivoting walls of the folding wall assembly into the deployed position by force of gravity.

The method may further include the step of placing goods in the utility cart. This may be followed by the step of returning the utility cart to the motor vehicle by folding the folding leg assembly from the second position to the first position. Further, the method may then include the step of inserting the base of the utility cart into the receiver in a load floor of the motor vehicle with the folding wall assembly in the deployed position, projecting upward from the base with the goods held on the base within the walls of the folding wall assembly.

Alternatively, the method may include returning the utility cart to the motor vehicle by displacing the folding wall assembly from the deployed position to the home position and pivoting the base of the utility cart from the use position to the stowed position. Further, the method may include folding the folding leg assembly from the second position to the first position. This may then be followed by the method of inserting the base of the utility cart into the receiver whereby the base forms an integral portion of the load floor of the motor vehicle and the folding leg assembly and the folding wall assembly are concealed under the base and the load floor.

In the following description, there are shown and described several preferred embodiments of the utility cart system for a motor vehicle. As it should be realized, the utility cart system is capable of other, different embodiments and its several details are capable of modification in various, obvious aspects all without departing from the utility cart system as set forth and described in the following claims. Accordingly, the drawings and descriptions should be regarded as illustrative in nature and not as restrictive.

DETAILED DESCRIPTION

The accompanying drawing figures incorporated herein and forming a part of the specification, illustrate several aspects of the utility cart system and together with the description serve to explain certain principles thereof.

Figure 5:
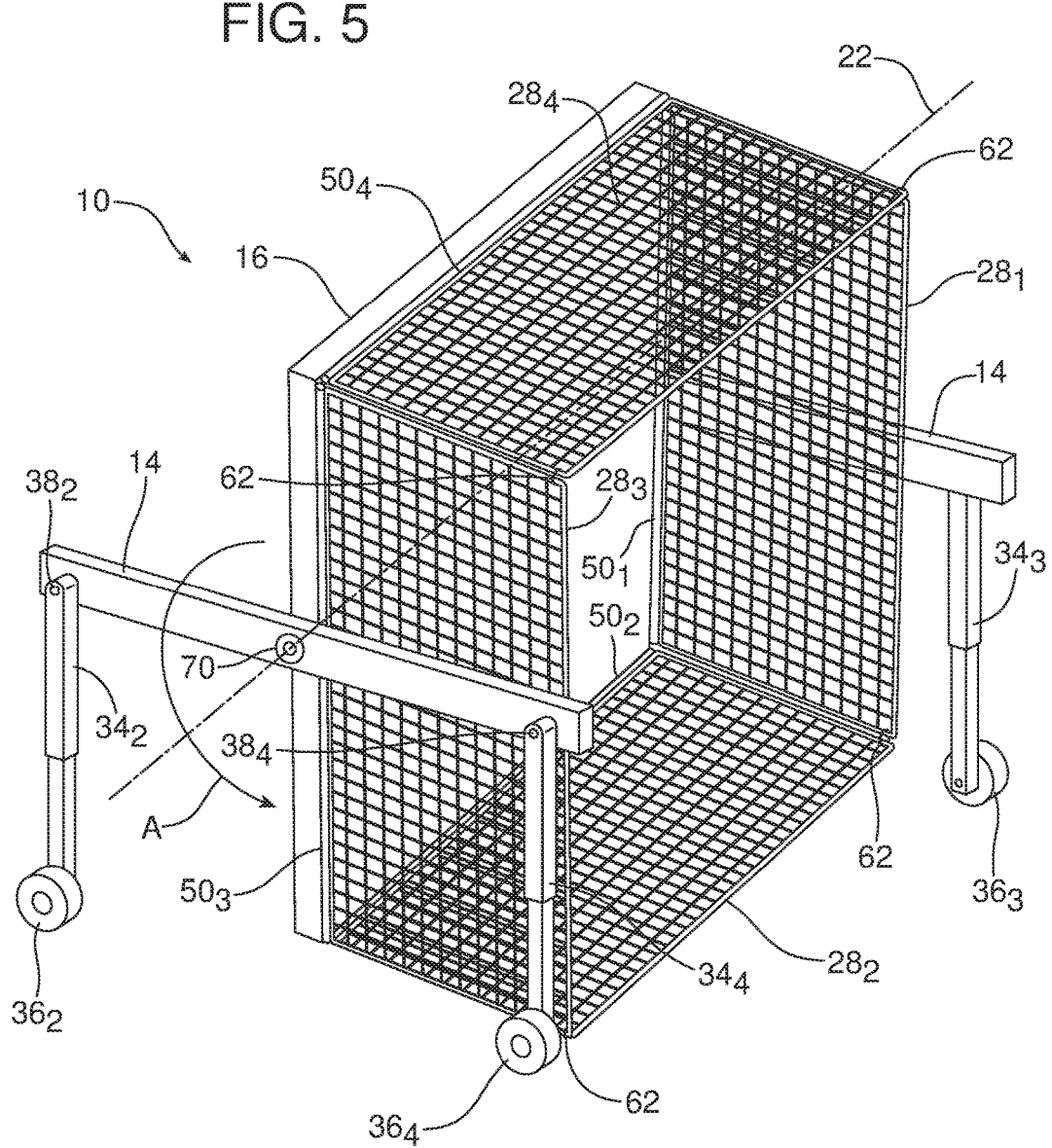

FIG. 5 is a schematic perspective view illustrating the displacement of the base from the stowed position, wherein the first face of the base is oriented upward, to the use position wherein the second face of the base is oriented upward so that the deployed folding walls project upward from the base and the base and the walls form a "basket" for holding goods or other items to be transported in the utility cart.

Figure 6:
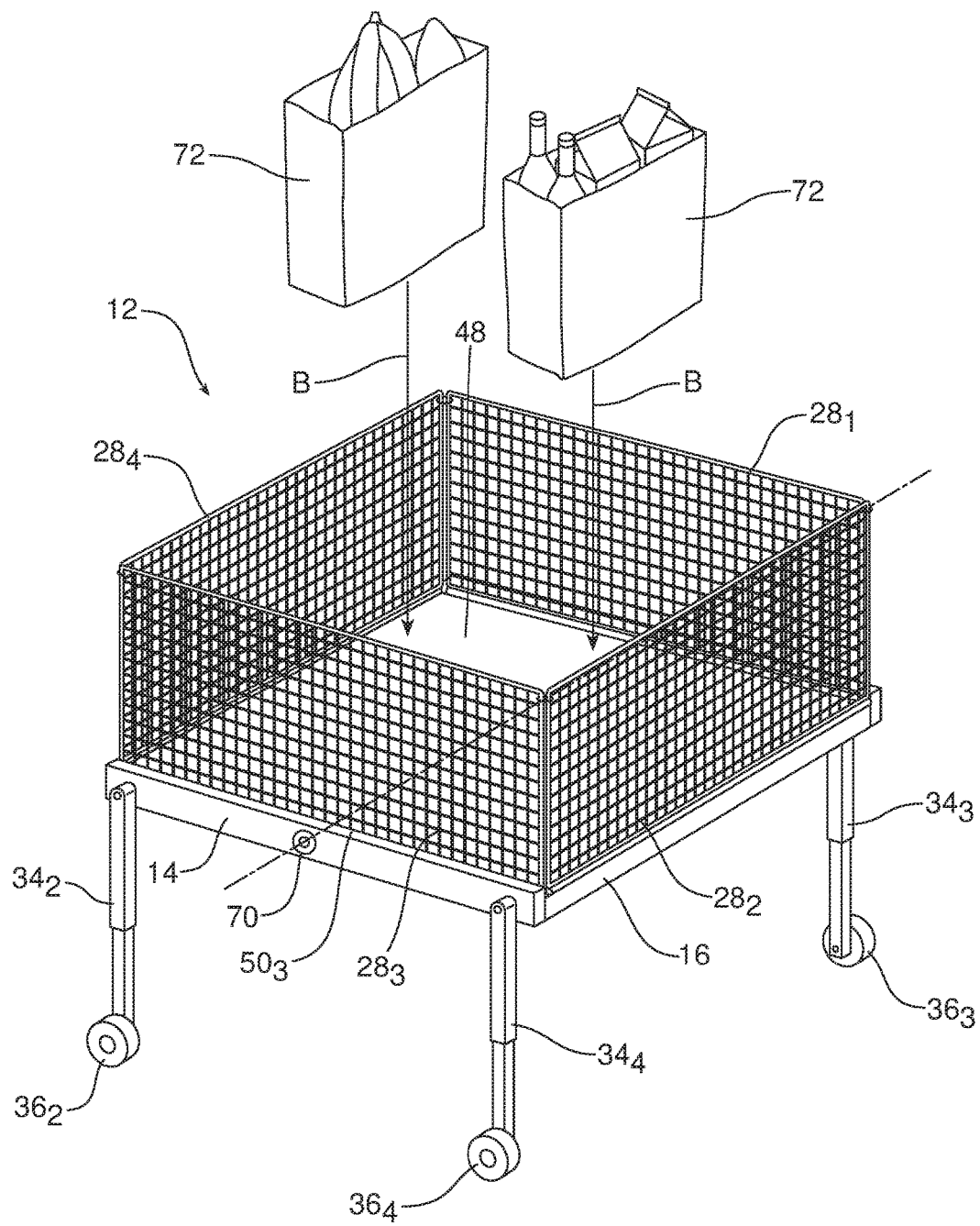

FIG. 6 discloses the fully erect utility cart ready for holding goods and other items.

Figure 7:
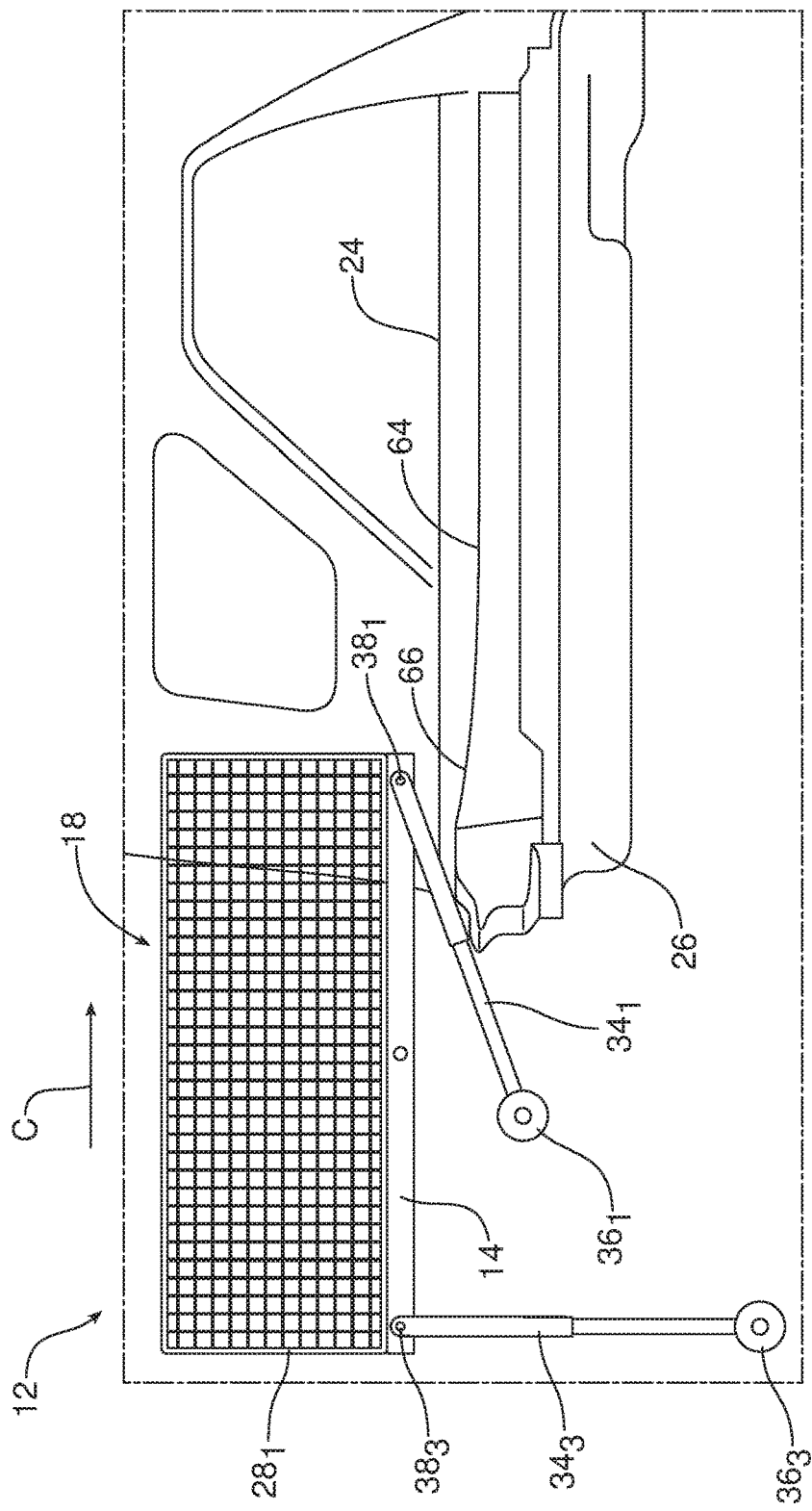

FIG. 7 illustrates how the fully erect utility cart may be loaded back into the receiver within the motor vehicle.

Figure 8:
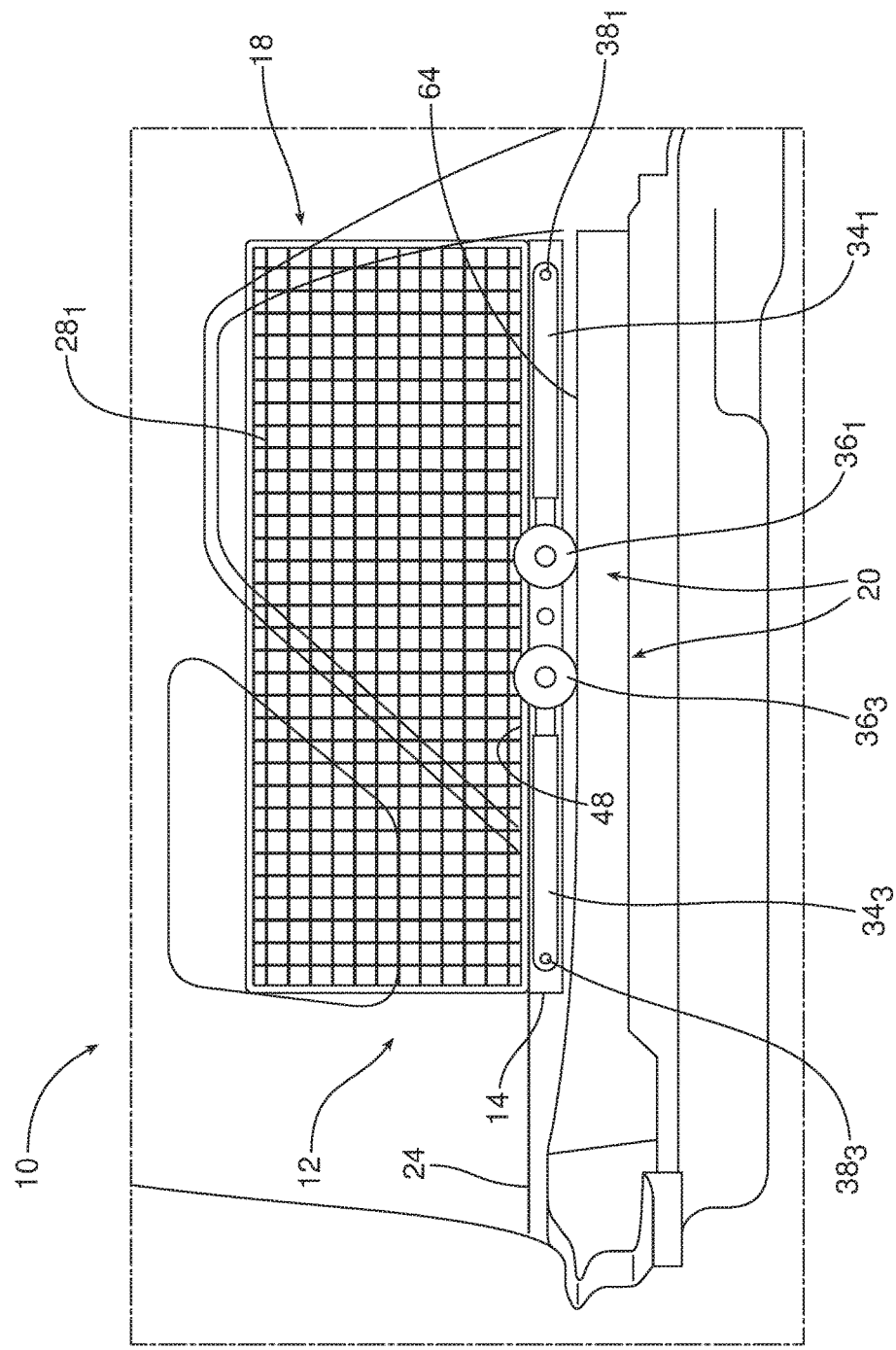

FIG. 8 illustrates how the utility cart may be positioned in the motor vehicle with the folding wall assembly in the deployed position so that goods and other items may be held in the utility cart when mounted in the receiver in the load floor of the motor vehicle.

Figure 9:
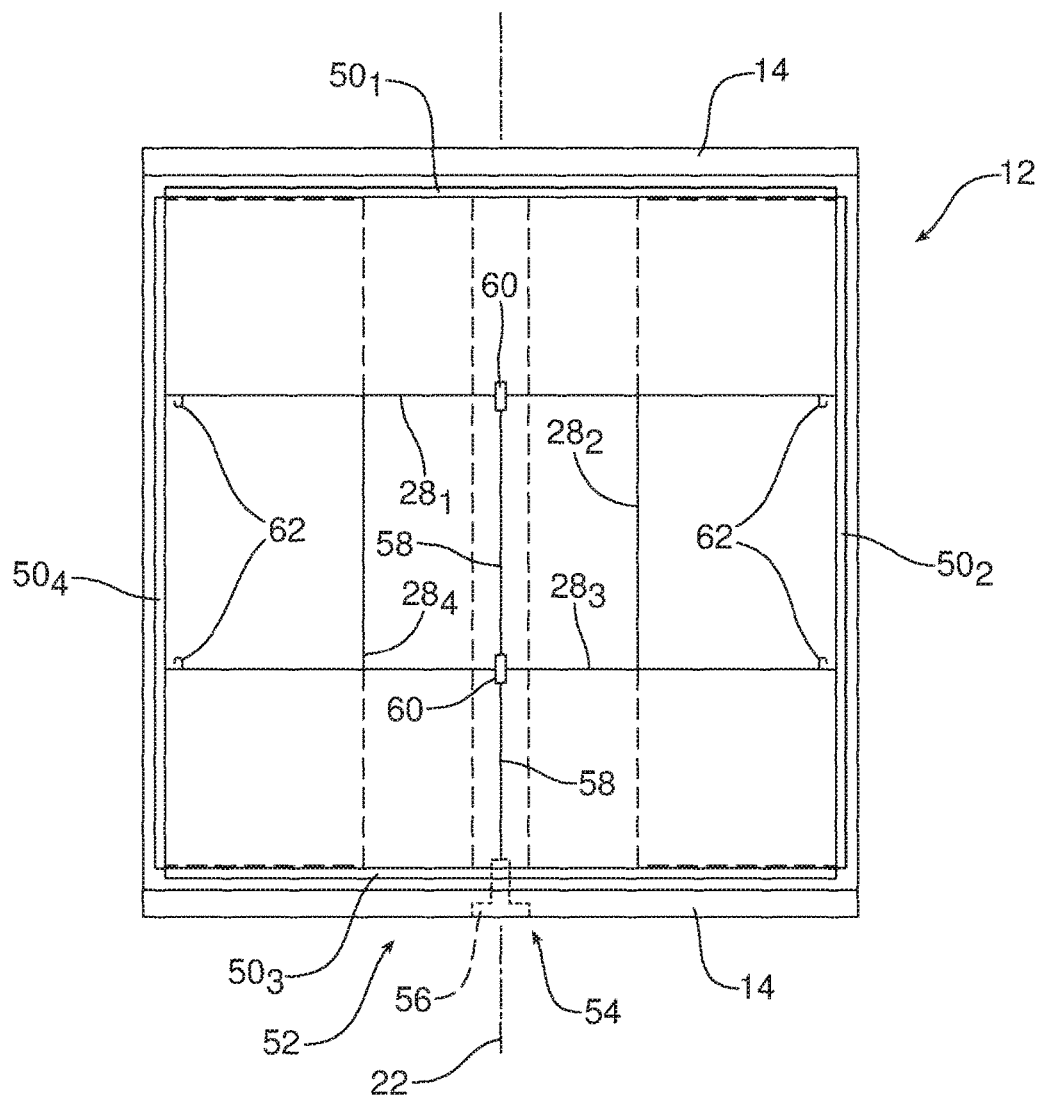

FIG. 9 is a schematic illustration of one possible embodiment of the locking feature for locking the walls of the folding wall assembly in the first position flat against the second face of the base.

Figure 10:
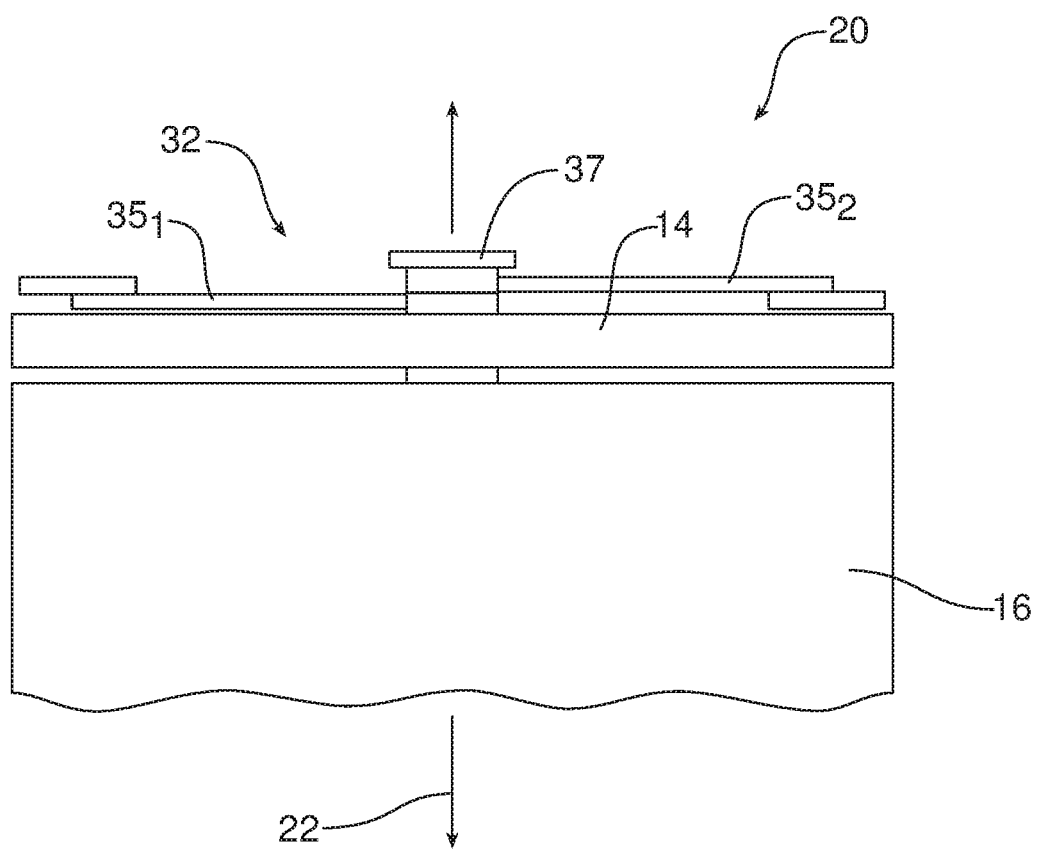

FIG. 10 is a schematic illustration of an alternative embodiment of the utility cart wherein the legs of the second section of the folding leg assembly pivot about the support frame of the same pivot axis as the base.

Reference will now be made in detail to the present preferred embodiments of the utility cart system for a motor vehicle, examples of which are illustrated in the accompanying drawing figures.

DETAILED DESCRIPTION

Reference is now made to FIGS. 1-8 illustrating the new and improved utility cart system 10 for a motor vehicle. That system includes a utility cart 12 including a support frame 14, a base 16, a folding wall assembly 18 and folding leg assembly 20.

More specifically, the base 16 is mounted on a pivot axis 22 to the support frame 14. The base 16 is displaceable between a stowed position, forming an integral portion of a load floor 24 of a motor vehicle 26 as illustrated in FIG. 1 and a use position as illustrated in FIGS. 6 and 7.

Figure 1:
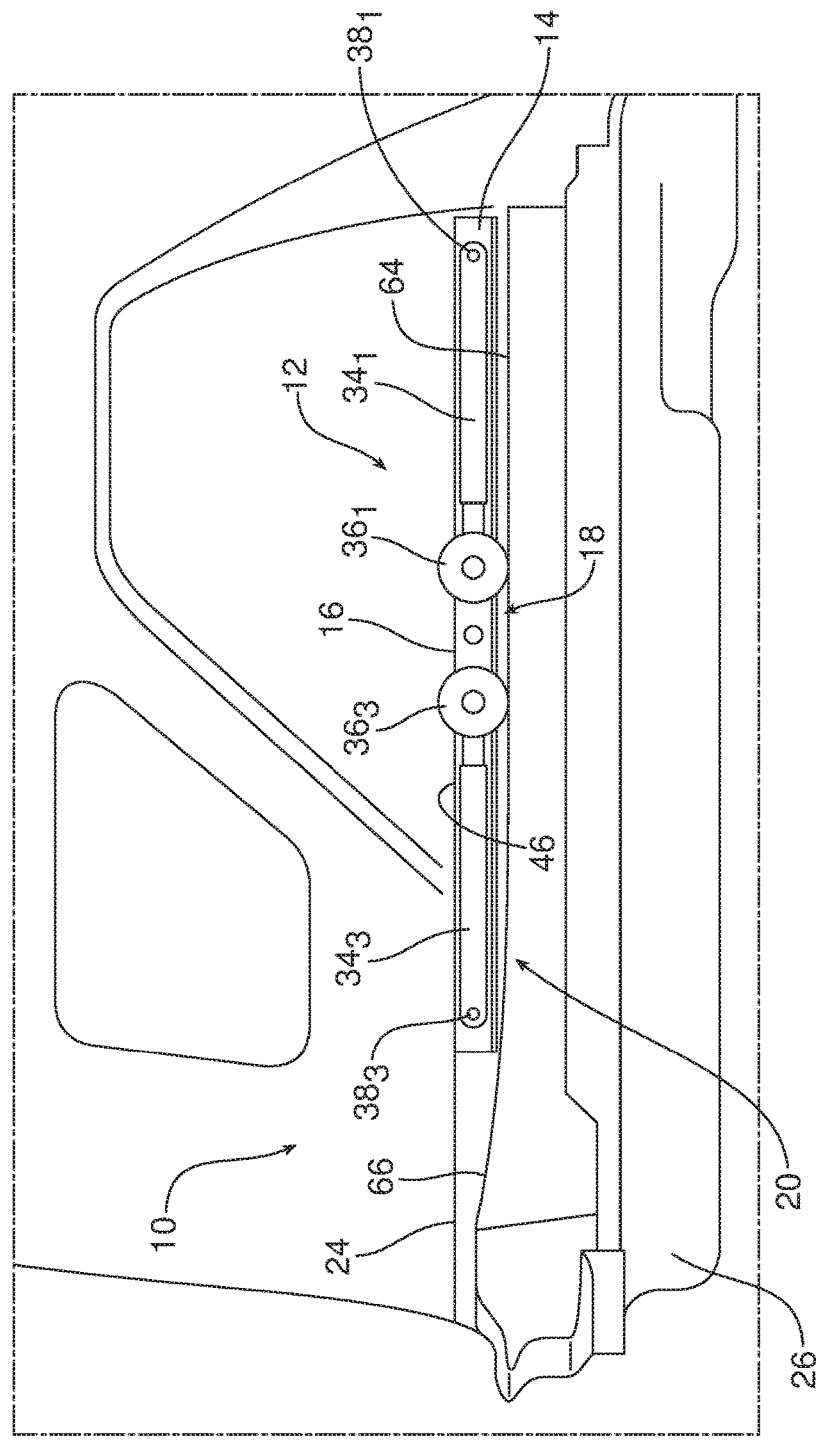
FIG. 1 is a schematic view of the utility cart system illustrating the utility cart in a stowed configuration wherein a first face of the base is integrated into the load floor of the motor vehicle and the folding wall assembly and folding leg assembly of the utility cart are concealed from view.
Figure 2:
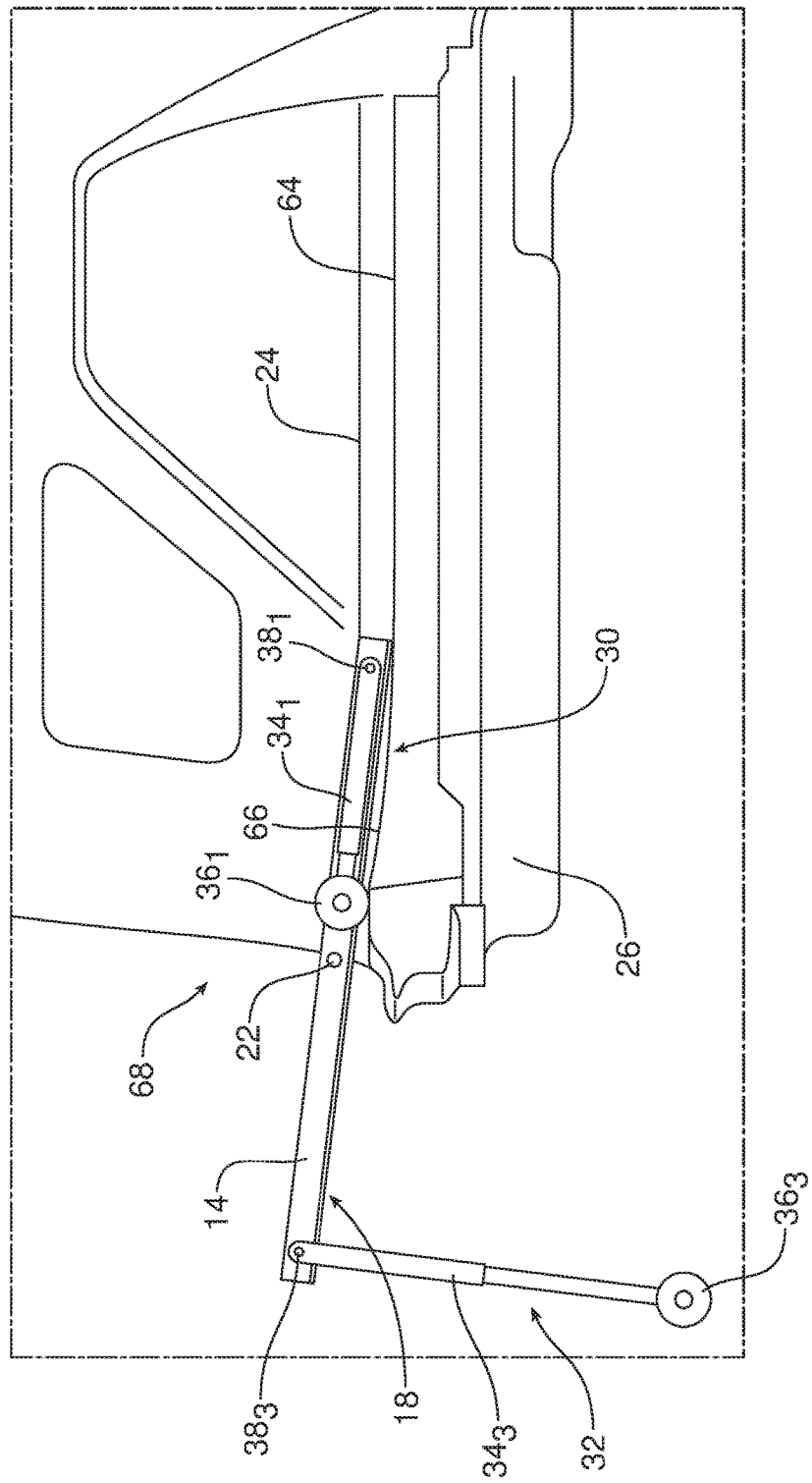
FIG. 2 is a schematic illustration similar to FIG. 1 but illustrating partial deployment of the utility cart from the motor vehicle.

The folding wall assembly 18 is carried on the base 16 and is displaceable between a home position wherein the walls $28_1$-$28_4$ of the folding wall assembly are oriented flat against the base as illustrated in FIGS. 1 and 2 and a deployed position wherein those walls project outwardly from the base 16 at a right angle as illustrated in FIGS. 4-7.

The folding leg assembly 20 is carried on the support frame 14. The folding leg assembly 20 includes a first section 30 and a second section 32. The first section 30 includes a first leg $34_1$ and a second leg $34_2$. The legs $34_1$, $34_2$ may be telescoping to provide for height adjustment. The first leg $34_1$ includes a first roller $36_1$ at the distal end thereof. The second leg $34_2$ includes a second roller $36_2$ at the distal end thereof. The second section 32 includes a third leg $34_3$ and a fourth leg $34_4$. The legs $34_3$, $34_4$ may also be telescoping to provide for height adjustment. The third leg $34_3$ includes a third roller $36_3$ at the distal end thereof. The fourth leg $34_4$ includes a fourth roller $36_4$ at the distal end thereof The first leg $34_1$ is pivotally attached to the support frame 14 by a first pivot $38_1$ at a proximal end thereof. The second leg $34_2$, the third leg $34_3$ and the fourth leg $34_4$ are also pivotally attached to the support frame 14 by respective second, third and fourth pivots $38_2$, $38_3$, $38_4$ at the proximal ends thereof.

The folding leg assembly 20 and, more particularly, the first section 30 and second section 32 thereof are displaceable between a first position folded along the base 16 as illustrated in FIG. 1 and a second or support position perpendicular to the base 16 as illustrated in FIGS. 3-7. A latching mechanism 40 functions to secure or selectively latch the folding leg assembly 20 in the first or the second position. In the embodiment of the utility cart 12 illustrated in FIGS. 1-8, the latching mechanism 40 may comprise a spring loaded detent (not shown) for each leg $34_1$-$34_4$ of a type known in the art.

More specifically, the base 16 includes a first face 46 and a second face 48. The first face 46 and the load floor 24 may be covered by a matching cover layer such as carpeting or the like so that when the utility cart 12 is stowed in the motor vehicle 26, the support frame 14, the folding wall assembly 18 and the folding leg assembly 20 are all concealed under the base 16 which his fully integrated in appearance with the load floor 24.

The folding wall assembly 18 is carried on the second face 48 of the base 16. More specifically, the folding wall assembly 18 includes a first wall $28_1$ mounted by a first pivot or hinge $50_1$ to the second face 48 of the base 16, a second wall $28_2$ mounted by a second pivot or hinge $50_2$ to the second face of the base, a third wall $28_3$ mounted by a pivot or hinge $50_3$ to the second face of the base and a fourth wall $28_4$ mounted by a fourth pivot or hinge $50_4$ to the second face of the base. A locking feature 52 allows the walls $28_1$-$28_4$ of the folding wall assembly 18 to be selectively locked in the home position resting flat against the second face 48 of the base 16 and the deployed position oriented perpendicular to the second face of the base. The locking feature 52 may be of a type known in the art to be suitable for this purpose. For example, as schematically illustrated in FIG. 9, the locking feature 52 may comprise a lock release actuator 54, including a knob 56 and a cable 58, connected to the locking clips 60 that selectively lock the walls 28 in the first position. Hooks 62 may be used to lock the walls $28_1$-$28_4$ in the erected or second position.

The utility cart system 10 also includes a receiver 64 in the load floor 24 of the motor vehicle 26. As illustrated in FIG. 1, the receiver 64 holds the utility cart 12, with the first face 46 of the base 16 oriented upward when the utility cart is in the stowed configuration. Here it should be noted how the load floor 24 and first face 46 of the base 16 provide a level and continuous surface for storing cargo while the other features of the utility cart 12 including the support frame 14, folding wall assembly 18 and folding leg assembly 20 are all concealed from view.

FIG. 8 illustrates how the utility cart 12 may be held in the receiver 64 with the second face 48 of the base 16 oriented upward and the walls 28 of the folding wall assembly 18 in the deployed position perpendicular to the second face 48 whereby goods and other items may be held within those walls on the second face 48 of the base 16 in the rear of the motor vehicle 26. In this use configuration, the second face 48 of the base 16 conceals the support frame 14 and the folding leg assembly 20. The utility cart system 10 also includes a ramp 66 that guides and assists one when removing the utility cart 12 from or positioning the utility cart 12 in the receiver 64.

The utility cart system 10, including the utility cart 12, are useful in a method of transporting goods to and from a motor vehicle 26. That method includes the step of removing the utility cart 12 from the receiver 64 in the motor vehicle. Compare FIGS. 1 and 2. This is done by sliding the utility cart 12 along the ramp 66 and through the opening 68 at the rear of the motor vehicle.

The method also includes the step of unfolding the folding leg assembly 20 of the utility cart by displacing the folding leg assembly from the first position to the second position. Note FIGS. 2 and 3. More specifically, one may first displace the second section 32 to the second or deployed position to support the end of the utility cart 12 that first extends through the opening 68 at the rear of the motor vehicle 26. This helps support the weight of the utility cart 12 as one continues to remove the utility cart from the motor vehicle 26. The first section 30 of the folding leg assembly 20 may be spring-loaded and may be automatically displaced to the deployed position about the pivot axis 42 as the second or forward end of the utility cart 12/base 16 is removed from the motor vehicle 26.

Figure 3:
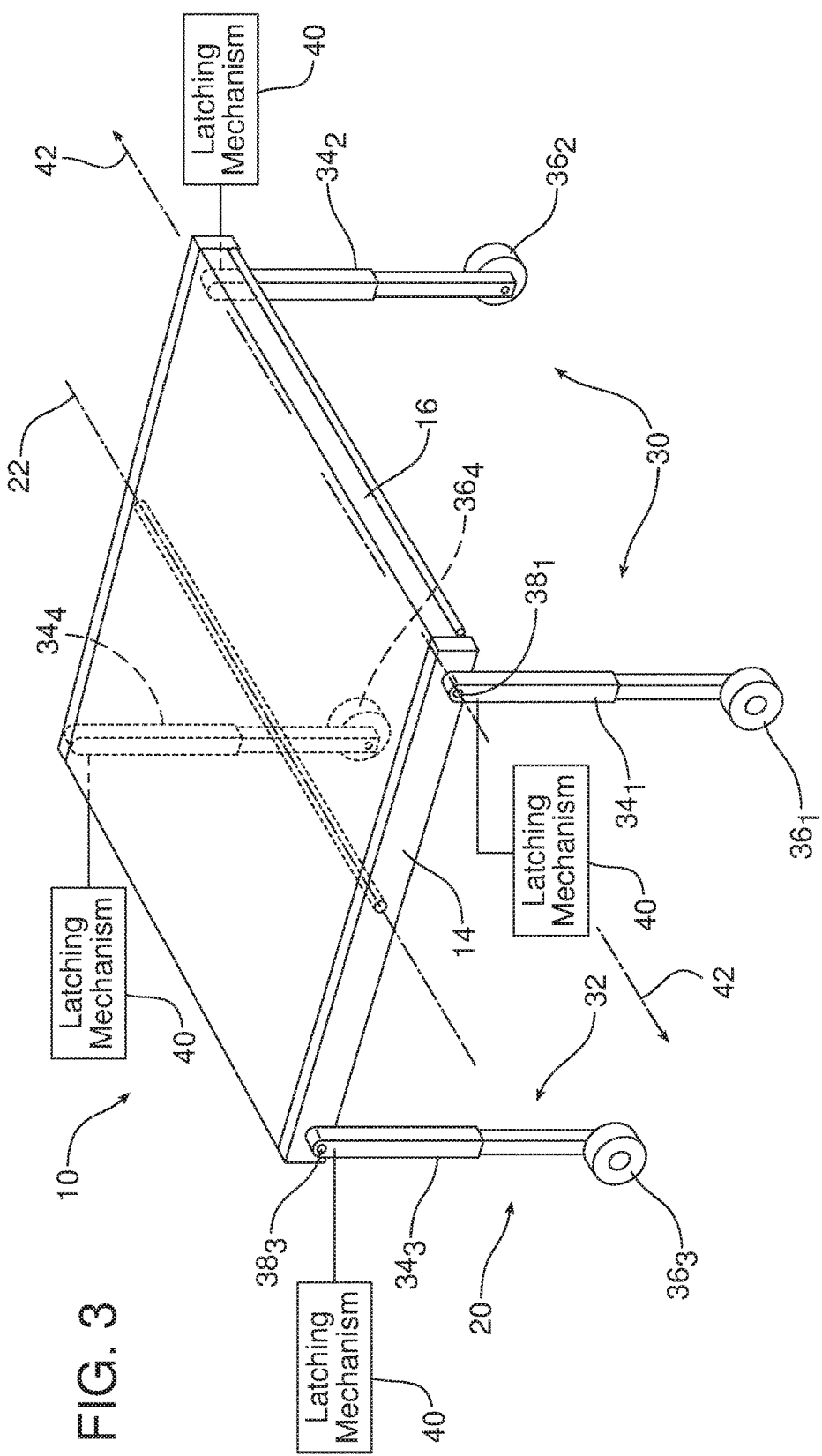
FIG. 3 is a schematic perspective view illustrating the utility cart removed from the motor vehicle and supported on the folding leg assembly which has been displaced into the second position for supporting the base of the utility cart above the ground.
Figure 4:
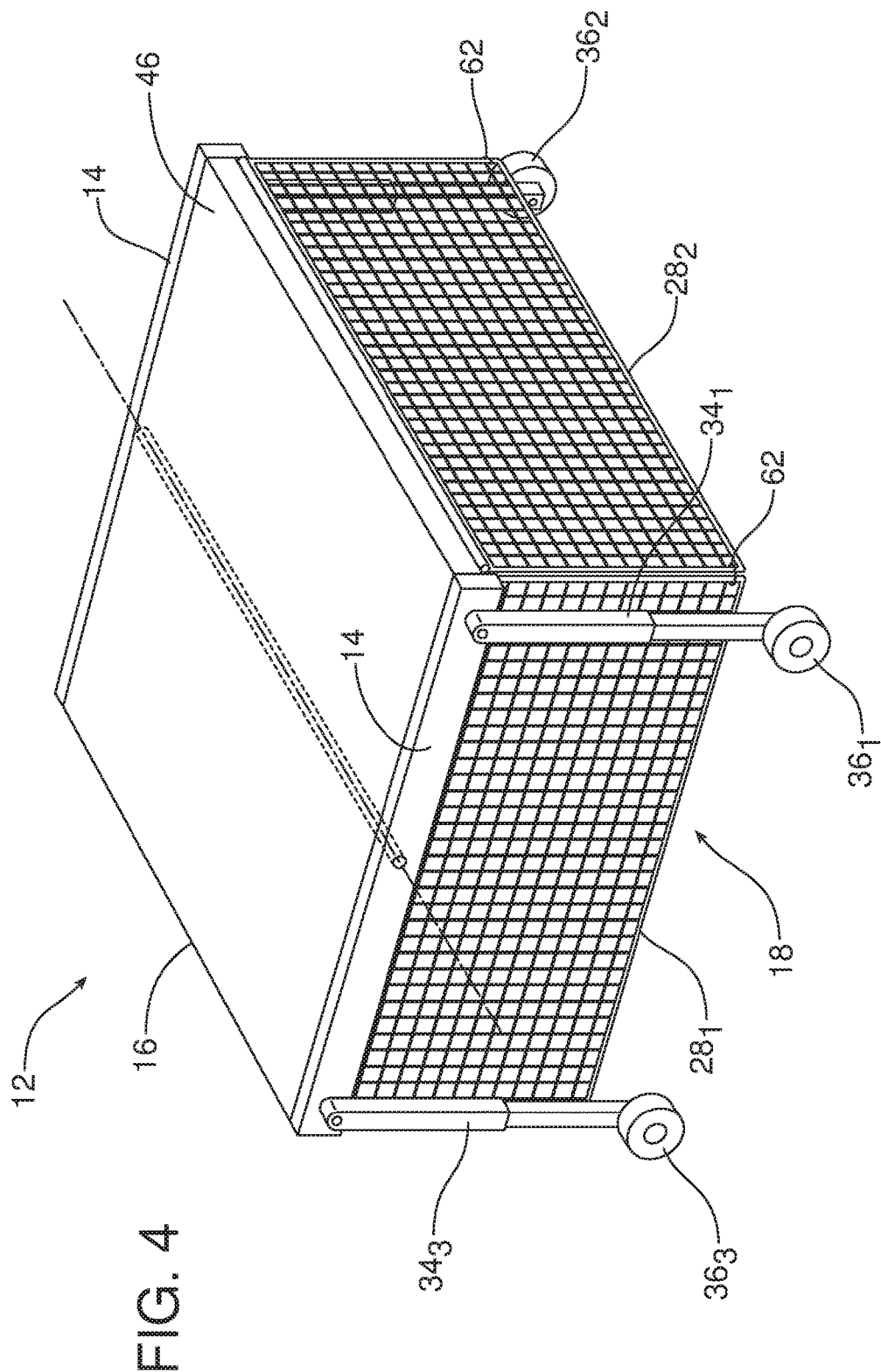
FIG. 4 is a view similar to FIG. 3 but illustrating the utility cart following deployment of the folding wall assembly from the home position wherein the walls rest along the second face of the base to the deployed position under the force of gravity.

Next, the method includes the step of displacing the folding wall assembly 18 from the home position illustrated in FIGS. 1-3 to the deployed position illustrated in FIG. 4. This is done by releasing the locking feature 52 while the second face 48 of the base 16 is still oriented downward. As a result the pivoting walls 28 of the folding wall assembly 18 are displaced into the deployed position by the force of gravity. Once deployed, the hooks 62 may secure the walls 28 in the deployed position perpendicular to the second face 48 of the base 16.

The next step of the method involves pivoting the base 16 of the utility cart 12 (note action arrow A) from the stowed position, wherein the first face 46 is oriented upward, to the deployed position wherein the second face 48 of the base is oriented upward. See FIGS. 4-6. This may be done by turning the twist knob 70 (see FIGS. 5 and 6) to release the base 16 and allow the base to be pivoted about the pivot axis 22 with respect to the support frame 14. When the base 16 is fully displaced into the deployed position, the twist knob 70 may be turned in the opposite direction to secure the base in this new position.

Next, the method may include the step of placing goods or other items 72 in the utility cart 12 on the second face 48 of the base 16 inside the deployed walls 28 (note action arrows B). As illustrated in FIG. 7, the utility cart 12 may then be returned to the motor vehicle 26 by aligning the utility cart with the receiver 64 and pushing the utility cart through the opening 68 at the rear of the vehicle with the second face 48 of the base 16 oriented up and the folding wall assembly 18 in the deployed position (note action arrow C). As this is done, the legs $34_1$, $34_2$ of the first section 30 engage the bumper and are pivoted about the respective pivot axis $38_1$, $38_2$ from the second or deployed position to the first or stowing position (see FIG. 7). As this is done, the base 16 is guided by the ramp 66 into the receiver 64 in the load floor 24 until fully seated in the receiver 64. In this configuration, the deployed folding wall assembly 18 functions to hold items contained within the walls $28_1$-$28_4$ on the second face 48 of the base 16, preventing them from rolling around and spilling onto the surrounding load floor 24. See FIG. 8.

In contrast to what is described above and illustrated in FIGS. 7 and 8, the utility cart 12 may be reconfigured into and stowed in the stowed configuration illustrated in FIG. 1 if desired. Toward this end, the goods 72 would be removed from the utility cart 12. The folding wall assembly 18 would be displaced from the deployed position to the home position by releasing the hooks 62 and folding all the walls $28_1$-$28_4$ about the hinges 50 until flat against the second face 48 of the base 16. The walls $28_1$-$28_4$ would then be secured in this position by the operation of the locking feature 52.

The folding leg assembly 20 is then displaced from the second position to the first position in the same manner as described above and shown in FIG. 7. When the utility cart 12 is fully seated in the stowed configuration in the receiver 64, it is fully integrated into the load floor 24 as shown in FIG. 1.

As illustrated in FIG. 10, in an alternative embodiment, at least the second section 32 of the folding leg assembly 20 may include a first leg $35_1$ and a second leg $35_2$ sharing the pivot axis 22 with the base 16. A single twist knob 37 may be provided to release the legs $35_1$, $35_2$ and/or the base 16 for rotation about the pivot axis 22 with respect to the support frame 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A utility cart system for a motor vehicle, comprising:
   a support frame;
   a base mounted on a pivot axis to said support frame and displaceable between a stowed position and a use position;
   a folding wall assembly carried on said base and displaceable between a home position and a deployed position; and
   a folding leg assembly carried on said support frame and displaceable between a first position and a second position.

2. The utility cart system of claim 1 wherein said base includes a first face and a second face, said folding wall assembly being carried on said second face.

3. The utility cart system of claim 2, wherein said first face and a load floor of said motor vehicle are covered by a matching cover layer.

4. The utility cart system of claim 1, wherein said folding leg assembly includes a first section and a second section.

5. The utility cart system of claim 4, wherein said first section includes a first pivot connection to said support frame and said second section includes a second pivot connection to said support frame.

6. The utility cart system of claim 5, wherein (a) said first section includes a first roller carried on a first leg and a second roller carried on a second leg and (b) said second section includes a third roller carried on a third leg and a fourth roller carried on a fourth leg.

7. The utility cart system of claim 6, further including a latching mechanism to selectively latch said folding leg assembly in said first position or said second position.

8. The utility cart system of claim 7, wherein said latching mechanism further includes a twist knob.

9. The utility cart system of claim 1, wherein said folding wall assembly includes a locking feature to selectively lock said folding wall assembly in said home position or said deployed position.

10. The utility cart system of claim 9, wherein said locking feature includes a plurality of locking clips and a lock release actuator.

11. The utility cart system of claim 10, wherein said lock release actuator includes a knob and a cooperating cable.

12. The utility cart system of claim 11, wherein said folding wall assembly includes a first wall mounted by a first hinge to said base, a second wall mounted by a second hinge to said base, a third wall mounted by a third hinge to said base and a fourth wall mounted by a fourth hinge to said base.

13. A method of transporting goods to and from a motor vehicle, comprising:
removing a utility cart from a receiver in said motor vehicle;
unfolding a folding leg assembly of said utility cart by displacing said folding leg assembly from a first position to a second position;
displacing a folding wall assembly from a home position to a deployed position; and
pivoting a base of said utility cart from a stowed position to a use position whereby said folding wall assembly is reoriented from a downwardly projecting position to an upwardly projecting position.

14. The method of claim 13, wherein said displacing of said folding wall assembly from said home position to said deployed position includes releasing a locking feature and pivoting walls of said folding wall assembly into said deployed position by force of gravity.

15. The method of claim 14, including placing said goods in said utility cart.

16. The method of claim 15, including returning said utility cart to said motor vehicle by folding said folding leg assembly from said second position to said first position.

17. The method of claim 16, including inserting said base of said utility cart into said receiver in a load floor of said motor vehicle with said folding wall assembly in said deployed position and oriented upward with said goods held on said base within said walls of said folding wall assembly.

18. The method of claim 14, including (a) returning said utility cart to said motor vehicle by displacing said folding wall assembly from said deployed position to said home position and (b) pivoting said base of said utility cart from said use position to said stowed position.

19. The method of claim 18, including folding said folding leg assembly from said second position to said first position.

20. The method of claim 19, including inserting said base of said utility cart into said receiver whereby said base forms an integral portion of a load floor of said motor vehicle and said folding leg assembly and said folding wall assembly are concealed under said base and said load floor.

* * * * *